June 12, 1951 — C. B. CHASE — 2,556,521
FILTER ELEMENT
Filed Nov. 14, 1946 — 3 Sheets-Sheet 1
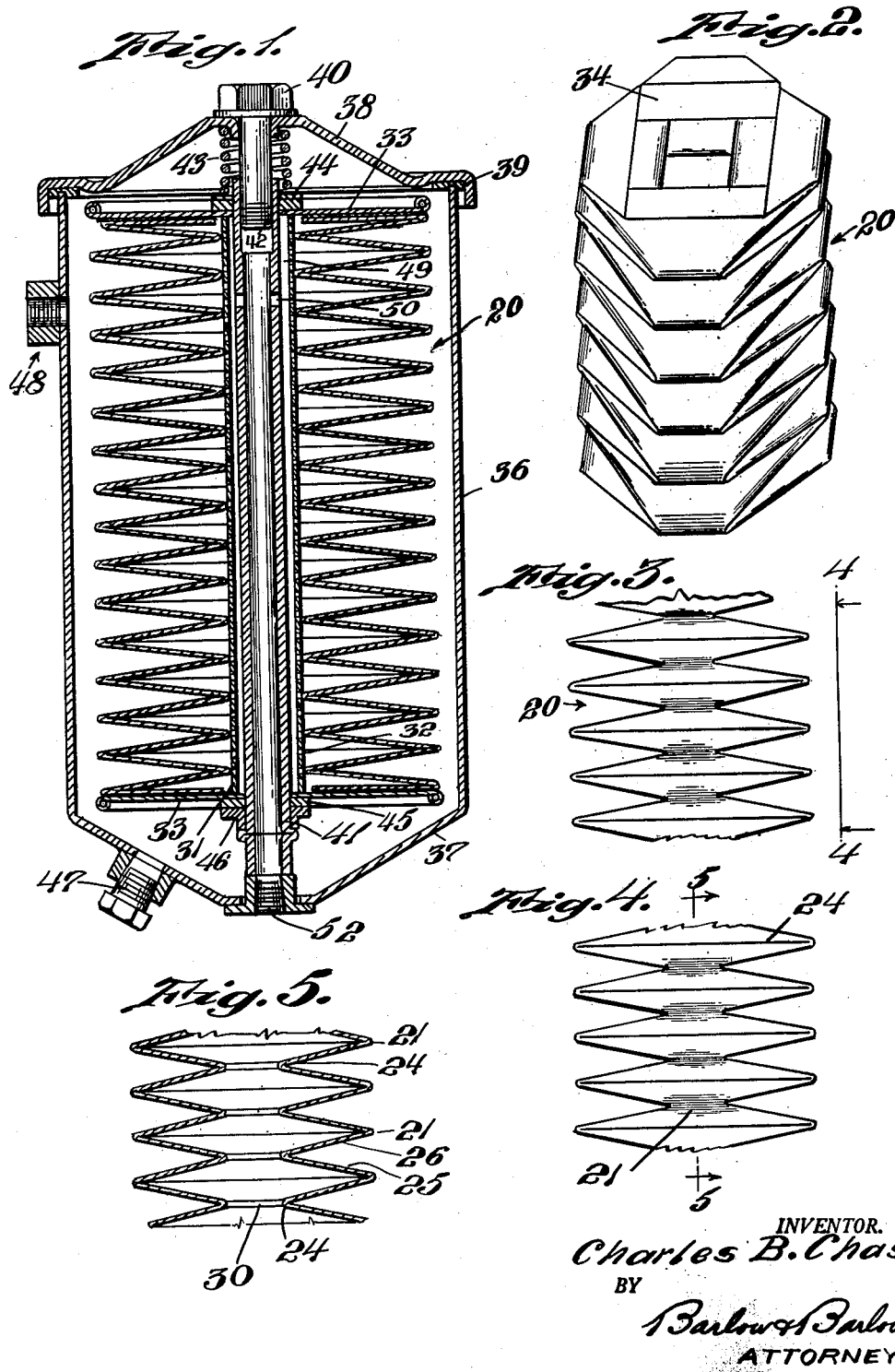
INVENTOR.
Charles B. Chase
BY
Barlow & Barlow
ATTORNEYS.

June 12, 1951  C. B. CHASE  2,556,521
FILTER ELEMENT

Filed Nov. 14, 1946  3 Sheets-Sheet 2

INVENTOR.
Charles B. Chase
BY
Barlow & Barlow
ATTORNEYS.

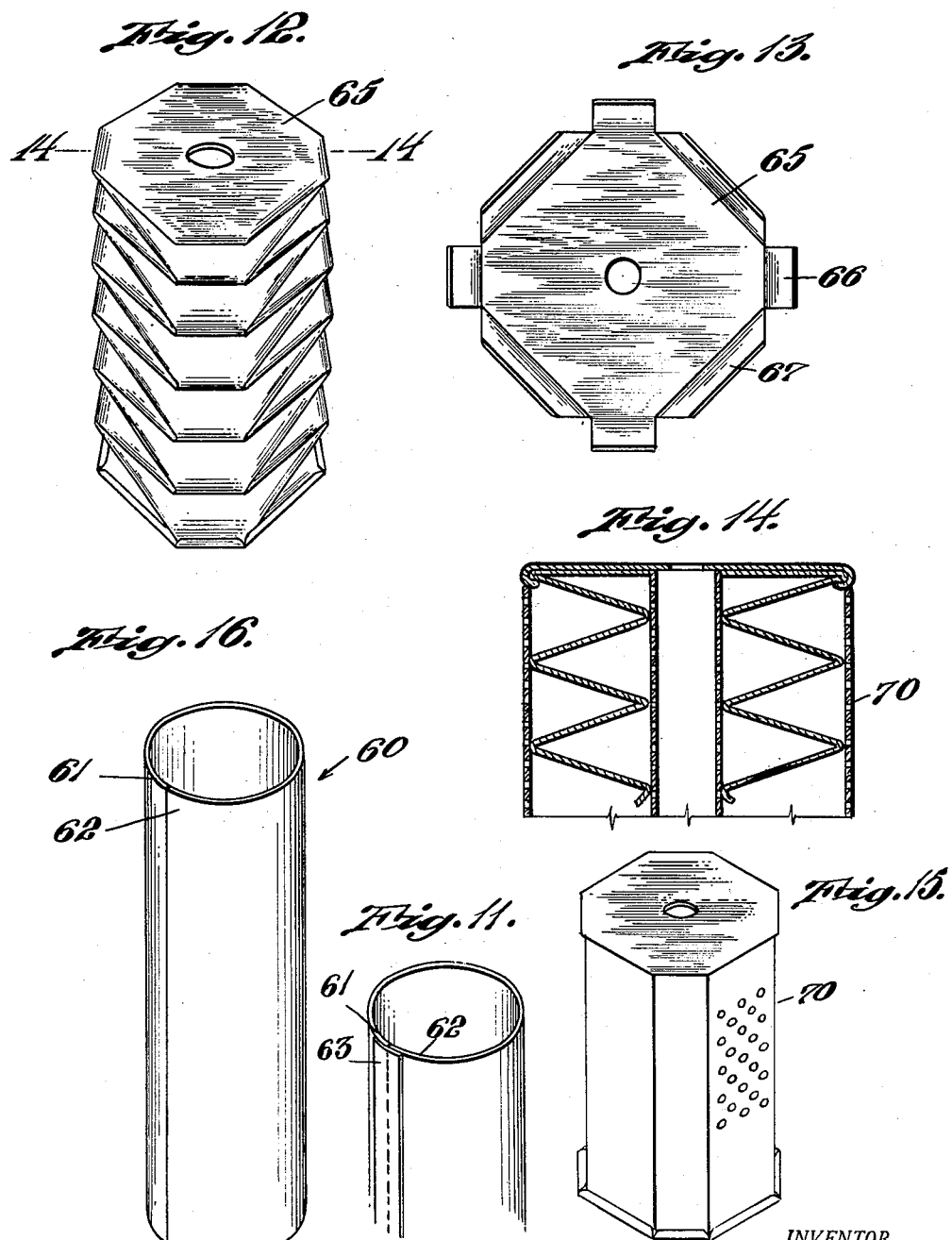

Patented June 12, 1951

2,556,521

UNITED STATES PATENT OFFICE 2,556,521

FILTER ELEMENT

Charles B. Chase, Rumford, R. I., assignor to Fram Corporation, a corporation of Rhode Island Application November 14, 1946, Serial No. 709,724

1 Claim. (Cl. 210—169)

This invention relates to a filter of the type in which there is a replaceable cartridge in a casing and the invention has more particularly to do with the cartridge.

In the use of filters wherein a cartridge is utilized which may be removed from a case and replaced with a fresh one, various filter media are utilized. Paper is utilized as one filter media and elements are made up from paper which is cut and arranged in various forms. The cutting and assembling of various members formed from paper in order to provide the desired filter element requires in many cases complicated machinery and a large amount of hand labor. Also in the formation of elements from paper, a large amount of paper is wasted and cannot be utilized. It is desirable in the formation of paper cartridges to expose a large amount of paper for fast flow of the filtrate and also to provide a large space in which the contaminant carried by the liquid to be filtered may be collected.

One of the objects of this invention is to provide a filter element formed from sheet material, such as paper, which may be of such a texture as to transmit filtrate relatively freely.

Another object of this invention is to provide a filter element from sheet stock, such as paper, which will be so arranged as to have a relatively large capacity for collecting contaminant.

Another object of this invention is the formation of a filter element from sheet stock, such as paper, which may utilize a large proportion of the paper stock which is supplied for use with little or no waste of the sheet material.

Another object of this invention is to provide a filter element which may be quickly formed by simplified machine operations.

Another object of this invention is to provide a filter element which may be formed more quickly than paper filter elements heretofore provided.

Another object of the invention is to provide a filter element which will require less hand operation in the formation of the same than sheet paper filter elements heretofore provided.

With these and other objects in view, the invention consists of certain novel features of construction as will be more fully described and particularly pointed out in the appended claim.

In the accompanying drawings.

Fig. 1 is a sectional view illustrating the filter case with my improved filter element located therein;

Fig. 2 is a perspective view of a sheet stock filter material in the form in which it is utilized in the filter element;

Fig. 3 is a fragmental elevation of the structure shown in Fig. 2 looking at one edge thereof;

Fig. 4 is a view similar to Fig. 3 and looking at right angles to the showing in Fig. 3 as for instance along the line 4—4 of Fig. 3;

Fig. 5 is a sectional view on line 5—5 of Fig. 4;

Fig. 11 is a perspective view of a fragmental portion illustrating another stage in the manufacture of the element shown in Fig. 16.

Fig. 12 is a perspective view of the filter element with a modified end plate thereon;

Fig. 13 is a plan view of the modified end plate alone;

Fig. 14 is a sectional view on the line 14—14 of a fragmental portion of Fig. 12 with a cylindrical shell;

Fig. 15 is a perspective view of the element with a shell about the same;

Fig. 16 is a perspective view of a modified arrangement of the filter element in one stage of its formation.

Figure 6:
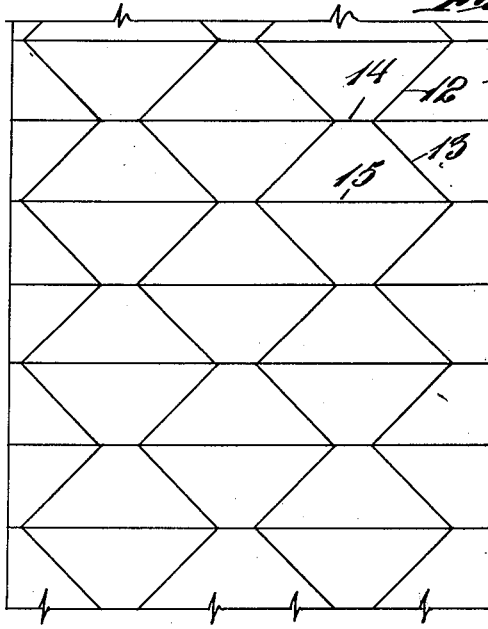
Fig. 6 is a top plan view of a sheet stock scored along certain lines which it is desired shall determine the fold lines for the filter element.

In proceeding with this invention which relates to the filter media, I utilize a sheet of paper as a convenient media through which the filtrate may pass. This paper may be of the desired thickness for purposes of rigidity and also of the desired texture for filtration of the oil or filtrate for which the element is to be used. The sheet stock is scored while in flat form to determine fold lines. It is then disposed in cylindrical form and the edges secured by gluing, clipping, or otherwise attaching the edges of the sheet stock either in overlapping or abutting relation. The cylinder or tube thus formed is then collapsed by applying pressure on the ends and at the sides of the tube so that the stock will be folded with portions disposed radially inwardly and radially outwardly from the periphery to provide a collapsed form somewhat in the nature of a concertina. The arrangement forms a hollow center so that the liquid to be filtered will enter the spaces left between the inwardly and outwardly disposed radial portion, pass thicknesswise through the sheet stock and deposit the contaminant on the sheet stock of these radially inwardly and outwardly extending walls. The filtrate will pass inwardly to the center and then be discharged from the casing in a usual manner.

With reference to the drawings, and more particularly to Figs. 6-10, the numeral 11 designates a sheet of stock which will usually be paper, although any foldable filtrate transmittable material may be used. This sheet 11 is scored along the lines 12, 13, 14 and 15, which by reason of the scoring will cause the material to fold more easily along these scored lines. This sheet stock is then rolled or disposed into generally cylindrical shape as shown generally at 16 in Fig. 7 with its opposite edges 17 and 18 overlapping and there secured by gluing or any other suitable attaching means which will prevent leaking of the filtrate therethrough, or the sheet may be disposed cylindrically as shown at 60 in Fig. 16 with its opposite edges 61 and 62 in abutting relation and secured by a thin strip of adhesive material 62 overlapping the joint between. When pressure is brought upon the ends and sides of the cylindrical formation shown at 16 in Fig. 7, the stock will fold along the scored lines above pointed out, something in the manner shown generally at 20 in Fig. 8 so that there will be provided a fold 21 corresponding to the score line 14 on the outer periphery of the structure while connecting the portions 22 and 23 there will be the fold line 24 which is disposed inwardly from the periphery and is a fold between the radially extending portions 25 and 26. In some cases scoring to determine fold lines is not necessary, thus they are omitted in Fig. 16 in which case by pressing upon the portions which are to extend inwardly the desired collapsing may be provided. These radially inwardly and outwardly extending portions serve as walls or shelves for collecting contaminant from the material to be filtered, which will pass crosswise through the sheet stock and then find its way to the center opening 30 which extends axially through the element. The fold lines will determine the shape of the element and the amount of collecting area provided for the contaminant. This shaping may be the subject of mathematical calculation for the area desired.

Figure 7:
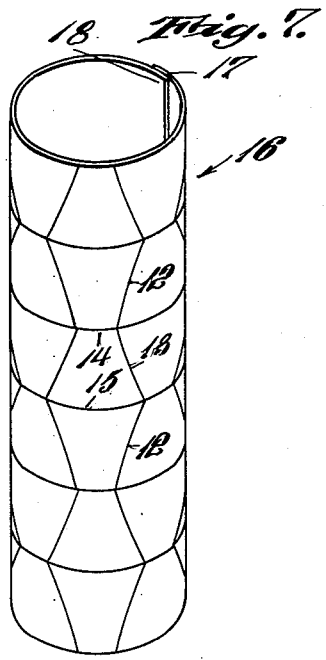
Fig. 7 is a perspective view of the sheet stock shown in Fig. 6 disposed in cylindrical form.
Figure 8:
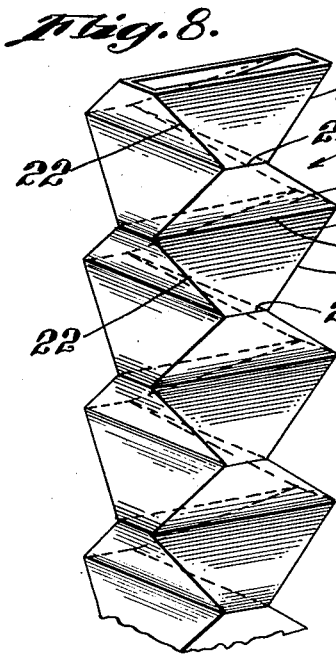
Fig. 8 is a perspective view of the tube shown in Fig. 7 after collapsed with the sheet material folding along the straight lines which have been scored to determine the fold lines of the element.
Figure 9:
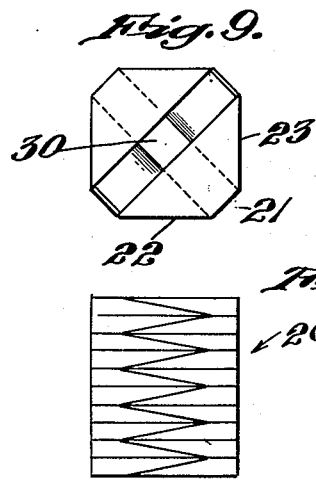
Fig. 9 is a top plan view of the structure shown in Fig. 2.
Figure 10:
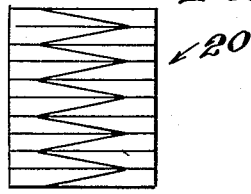
Fig. 10 is an edge elevation of the structure shown in Fig. 9.

Proper lengths of element will usually be provided by cutting the sheet stock prior to the bending of the same into cylindrical formation such as shown in Fig. 7 or 16. Thus, after collapsing the stock it will be merely necessary to place into the element a rigid perforated tubular member 31 (see Fig. 1) which may be of metal or fiber with suitable perforations 32 therein and which may be of a shape such as square to fit the opening 30. This rigid perforated tube will be substantially the length which it is desired that the filter element should be and after it is placed in position, the end plates 33 of some rigid material are cemented to the end portions 34 of the collapsed paper element with some sort of an adhesive to prevent leakage of the filtrate therethrough. The end plates in some cases may be as shown at 65 in Fig. 13 with wings 66 and 67 provided thereon which wings are folded beneath the upper parts of the collapsed element as shown in Figs. 12 and 14 to secure the plate in position in a sealed manner. In some cases, clipping will be sufficient while in other cases both the clipping and cementing will be desirable.

From the functional standpoint, it becomes unnecessary to encase the paper element but if protection of the filter element against the entrance of oil under substantial pressure or from damage during shipping or handling is desired, a cylindrical shell 70 may be placed about the collapsed paper tube (Fig. 14). In cases where the end plate 65 is used a tubular shell 70 of a shape to fit the shape of the element 20 and plates 65 may be formed and positioned over the end of the element with its edges against the plates to hold it in position. This shell is perforated for the free entry of the liquid to be filtered.

The filter casing in which the element is located consists of a metallic cylindrical shell 36 (see Fig. 1) which has a bottom 37 with drain plug 47 and is provided with a cover 38 setting upon a sealing gasket 39. This cover is secured in position by a screw 40 extending into the upper end of the center tube 41 which is threaded as at 42. Spring 43 serves to press upon the washer 44 to seal the joint between the center tube and the top wall 33 of the element. Likewise, a washer 45 is provided at the bottom of the element to rest upon the abutment 46 and seal this end with the center tube.

A liquid such as oil to be filtered enters as at 48, passes through the paper thicknesswise thereof out through the openings 32 in the tube 31 to the space 49 about the center tube 41 and then through the opening 50 in the center tube and downwardly to pass out of the filter case through the opening 52. For changing the element it is merely necessary to remove the cover, withdraw the element from its seat, and replace with a fresh one.

I claim:

A filter element or cartridge for a liquid filter, comprising a continuous sheet of paper or other filtering material having substantial rigidity, said sheet being of generally tubular form and axially collapsed to provide a series of axially-spaced contaminant-collecting walls that diverge inwardly and outwardly respectively from outer and inner transversely-extending fold lines, and plates secured to the ends of the collapsed tubular member, and a rigid tube extending through the collapsed tubular member and between the end plates thereof, said rigid tube being apertured intermediate its ends and engaging the collapsed tubular member at the inner fold lines thereof.

CHARLES B. CHASE.

REFERENCES CITED

The following references are of record in the file of this patent:

UNITED STATES PATENTS

| Number | Name | Date |
|---|---|---|
| 522,752 | Feigl | July 10, 1894 |
| 1,025,457 | Dunfee | May 7, 1912 |
| 1,074,008 | Nagel | Sept. 23, 1913 |
| 1,970,666 | Martinet | Aug. 21, 1934 |
| 1,996,785 | Altheimer | Apr. 9, 1935 |
| 2,164,966 | Tutein | July 4, 1939 |
| 2,186,440 | Williams | Jan. 9, 1940 |
| 2,239,868 | Williams | Apr. 29, 1941 |
| 2,355,714 | Eberman | Aug. 15, 1944 |
| 2,364,617 | Bolser | Dec. 12, 1944 |
| 2,372,865 | Taylor | Apr. 3, 1945 |
| 2,468,866 | Collier | May 3, 1949 |

FOREIGN PATENTS

| Number | Country | Date |
|---|---|---|
| 366,080 | Italy | Dec. 19, 1938 |